M. FUJII.
PRISMATIC BINOCULAR.
APPLICATION FILED JAN. 16, 1917.

1,373,554.

Patented Apr. 5, 1921.

Witnesses.
Den Kido
Eishiro Abe

Inventor.
Mitsuzo Fujii.
Albert Parker
Attorney

UNITED STATES PATENT OFFICE.

MITSUZO FUJII, OF MITA, SHIBA-KU, TOKYO, JAPAN.

PRISMATIC BINOCULAR.

1,373,554.  Specification of Letters Patent.  Patented Apr. 5, 1921.

Application filed January 16, 1917. Serial No. 142,672.

*To all whom it may concern:*

Be it known that I, MITSUZO FUJII, a subject of the Empire of Japan, residing at 2 Toyookamachi, Mita, Shiba-ku, Tokyo, Japan, have invented certain new and useful Improvements in Prismatic Binoculars, of which the following is a specification.

This invention relates to improvements in prismatic binoculars, and particularly to adjusting devices for the prisms of such binoculars.

The objects of the invention are to permit easy and accurate adjustment of the prism, or prisms and to firmly hold the same in position without interfering with the reflecting surfaces thereof.

According to the invention curved plates made of resilient or spring metal are mounted on the sloping slides of the prism or prisms, so that they do not touch the reflecting surfaces thereof, and these plates are pressed toward the said sloping sides, by means of adjusting screws, or the like, preferably at right angles to said sides, so that by suitable relative adjustment of oppositely disposed plates, the prism may be accurately positioned.

Figure 1:
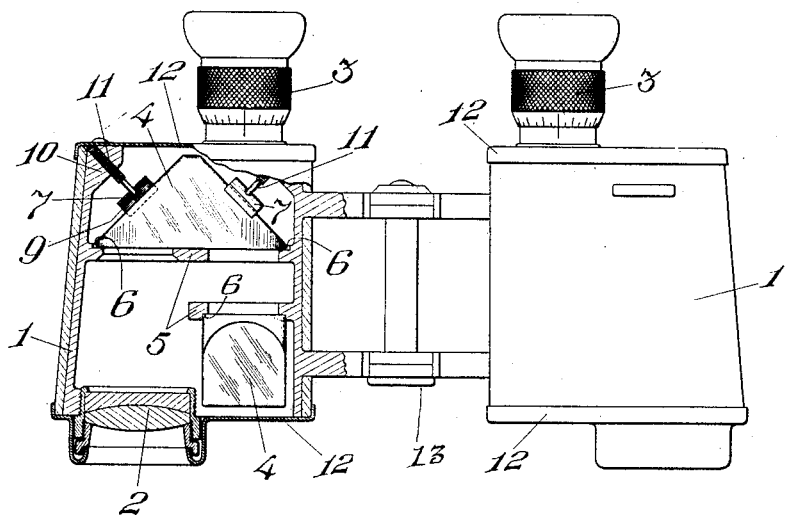
Figure 1 is a view of a pair of prismatic binoculars, showing the same partly in outside elevation and partly in vertical section.

In prismatic binoculars, as heretofore proposed, there are various systems employed for insuring parallelism of the emergent pencils of light by adjusting the position of the prism or prisms. One manner of effecting such adjustment is by moving the prism or prisms on its or their seatings, transversely of the axes of the pencils of light and the present invention relates to certain improvements in means for effecting the adjustment in this maner.

The accompanying drawings show one form of adjusting means applied to a pair of binoculars, in which the body 1 of the binoculars is provided as usual with the objective lenses 2 and the eye pieces 3. The upper prism 4 is supported by a shelf or partition 5 having a recessed seating 6, which is of such form that the prism can slide thereon in one direction transversely of the body 1, but cannot move in a direction at right angles to said first direction. That is, the prism can move only toward or away from the hinge 13.

Similarly, the lower prism is supported against the underneath recessed seating 6 of a second shelf or partition 5, the lower prism being prevented by the seating from movement toward or away from the hinge 13, but being movable on its seating in a direction at right angles to the direction of movement of the upper prism.

Figure 2:
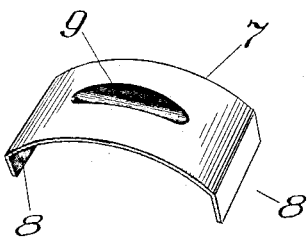
Fig. 2 is an enlarged perspective view of a resilient or spring plate which forms the principal part of the invention.

Fig. 2 shows on an enlarged scale, a plate 7, made of resilient or spring metal, and bent into the form of an arc, the plate having legs 8, 8 at both ends, as shown. These plates are mounted as shown in Fig. 1, on the sloping sides of the upper prism at the central parts of the latter so that the ends of the plates are in contact with the surfaces of the prism only at the extreme edges thereof, the legs 8, 8 contacting with the straight sides of the prism. Adjusting screws 11, 11 are threaded into the projections 10, 10 formed at the inner edges of the body 1, these screws being at right angles to the surface of the plates, and the ends of the screws entering into recesses 9, 9 formed on the plates at the central parts thereof.

The lower prism 4 is kept in position against its seating 6 by plates 7, 7, not shown on the drawings, these plates and their adjusting screws being arranged similarly to those of the upper prism, but of course inverted due to the inversion of the lower prism.

It will be seen that by removing any of the end plates 12, 12 of the body and by suitably adjusting the adjusting-screws 11, 11 relatively to each other, the position of the corresponding prism on its seating may be adjusted with great accuracy and quickness.

The plates 7, 7 being in contact with the prism only at its extreme edges, there is no danger of the reflecting surfaces of the prism being interfered with, and further, as the plates, shaped as aforesaid, act as cushions against the pressure of the adjusting screws, the prism is effectively held in position by pressure at its central part, and strain which is liable to disturb definition cannot occur.

I claim:

1. The combination in an optical instrument, a seat, a prism arranged on the seat and having two angularly-arranged faces and parallel sides, a separate independent curved resilient plate for each of the angularly-arranged faces extending transversely across and out of contact with each of the angularly-arranged faces, the ends of each of said plates extending at angles to the body of the plate and engaging the parallel sides only of said prism, and adjusting means engaging the central portions of said plates for shifting and holding said prism on its seat.

2. A combination as defined in claim 1 in which the central portion of each plate is provided with a longitudinally extending recess, and in which the adjusting means consists of screws which engage said recess.

3. Adjusting means for prismatic binoculars, comprising a curved resilient plate extending transversely across and out of contact with the sloping side of a prism and curved to conform to an arc including the extreme edges of said sloping side, and means for adjustably pressing said plate against said edges.

In testimony whereof I have affixed my signature in presence of two witnesses.

MITSUZO FUJII.

Witnesses:
  DEN VIDO,
  EISHIRO ABE.